(12) United States Patent
Uchino et al.

(10) Patent No.: US 9,655,146 B2
(45) Date of Patent: May 16, 2017

(54) MOBILE COMMUNICATION METHOD AND MOBILE STATION

(71) Applicant: NTT DOCOMO, INC., Tokyo (JP)

(72) Inventors: Tooru Uchino, Tokyo (JP); Sadayuki Abeta, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/423,633

(22) PCT Filed: Aug. 19, 2013

(86) PCT No.: PCT/JP2013/072052
§ 371 (c)(1),
(2) Date: Feb. 24, 2015

(87) PCT Pub. No.: WO2014/034455
PCT Pub. Date: Mar. 6, 2014

(65) Prior Publication Data
US 2015/0245386 A1 Aug. 27, 2015

(30) Foreign Application Priority Data

Aug. 29, 2012 (JP) ................. 2012-188692

(51) Int. Cl.
*H04W 74/08* (2009.01)
*H04W 74/00* (2009.01)
(Continued)

(52) U.S. Cl.
CPC ......... *H04W 74/0833* (2013.01); *H04W 8/26* (2013.01); *H04W 74/004* (2013.01); *H04W 74/008* (2013.01); *H04W 74/02* (2013.01); *H04W 76/021* (2013.01); *H04W 16/32* (2013.01); *H04W 84/045* (2013.01)

(58) Field of Classification Search
CPC . H04W 76/02; H04W 76/021; H04W 76/025; H04W 76/027
See application file for complete search history.

(56) References Cited

U.S. PATENT DOCUMENTS

2013/0028198 A1* 1/2013 Yamada ............ H04W 56/0005
370/329

OTHER PUBLICATIONS

3GPP TS 36.300 V11.2.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), Jun. 2012 (201 pages).

(Continued)

*Primary Examiner* — Ashley Shivers
(74) *Attorney, Agent, or Firm* — Osha Liang LLP (57) ABSTRACT

A radio base station PhNB managing a phantom cell is enabled to uniquely identify a mobile station UE in communication in the phantom cell. A mobile communication method according to the present invention includes starting, by the radio base station PhNB#10, a "Non-contention based RA procedure" or a "Contention based RA procedure" with a mobile station UE#1 in communication in a cell #10 under control of the radio base station PhNB#10; and notifying, by the mobile station UE#1, the radio base station PhNB#10 of a $C\text{-}RNTI_{macro}$ which is allocated in a cell #1 other than the cell #10.

4 Claims, 8 Drawing Sheets (51) Int. Cl.
H04W 76/02 (2009.01)
H04W 8/26 (2009.01)
H04W 74/02 (2009.01)
H04W 16/32 (2009.01)
H04W 84/04 (2009.01)

(56) References Cited

OTHER PUBLICATIONS

Y. Saito et al., "Evaluation of Downlink System Throughput for Phantom Cells Using Higher Frequency Bands," Proceedings of the 2012 IEICE Communications Society Conference 1, Aug. 28, 2013, 456, ISSN 1349-1415 (15 pages).
International Search Report issued in corresponding international application PCT/JP2013/072052, mailed on Nov. 5, 2013 (1 page).
Written Opinion issued in corresponding international application PCT/JP2013/072052, mailed on Nov. 5, 2013 (3 pages).

* cited by examiner

MOBILE COMMUNICATION METHOD AND MOBILE STATION

TECHNICAL FIELD

The present invention relates to a mobile communication method and a mobile station.

BACKGROUND ART

Figure 4:
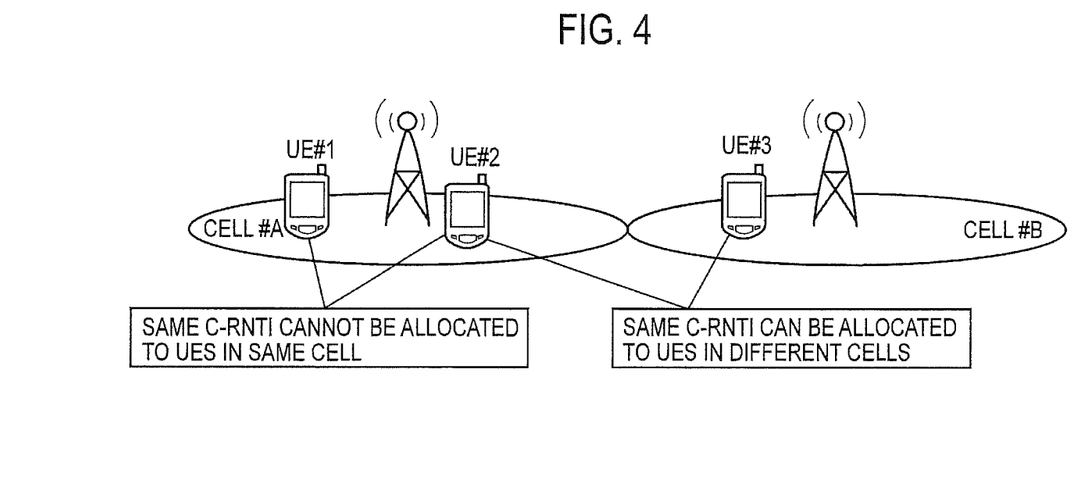
FIG. 4 is a diagram for illustrating a conventional technology.

In LTE (Long Term Evolution), a radio base station eNB is configured to transmit/receive data to and from a mobile station UE performing communications in a cell under the control thereof, with a C-RNTI (Cell-Radio Network Temporary Identifier) allocated to the mobile station UE as illustrated in FIG. 4 (see, Non-patent document 1).

The C-RNTI is allocated on a cell-by-cell basis. In LTE, as illustrated in FIG. 4, a same C-RNTI cannot be allocated to a mobile station UE#1 and a mobile station UE#2 which perform communications in a same cell #A, and a same C-RNTI can be allocated to a mobile station UE#1 (or a mobile station UE#2) and a mobile station UE#3 which perform communications in different cells #A/#B.

Here, the C-RNTI is allocated in "Contention based RA (Random Access) Procedure" or a handover procedure.

In addition, the radio base station eNB is configured to assign resources for transmitting downlink data and uplink data by using the C-RNTI allocated to the mobile station UE.

Meanwhile, in the "Rel-12 workshop" of the 3GPP, many proposals on "Small cell enhancement" have been made as topics of FRA (Future Radio Access).

In such proposals, a concept of "Phantom cell" has been discussed.

Figure 5:
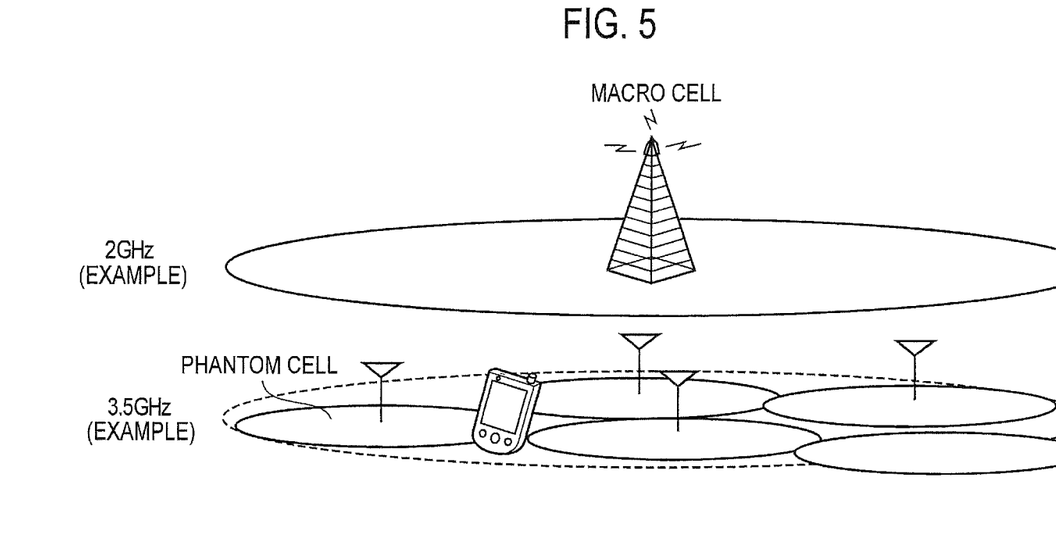
FIG. 5 is a diagram for illustrating the conventional technology.

As illustrated in FIG. 5, unlike a conventional macro cell, a phantom cell can cover a wider area by linking many "small cells" to form one large cell.

PRIOR ART DOCUMENT

Non-Patent Document

Non-patent document 1: 3GPP TS36.300

SUMMARY OF THE INVENTION

Figure 6:
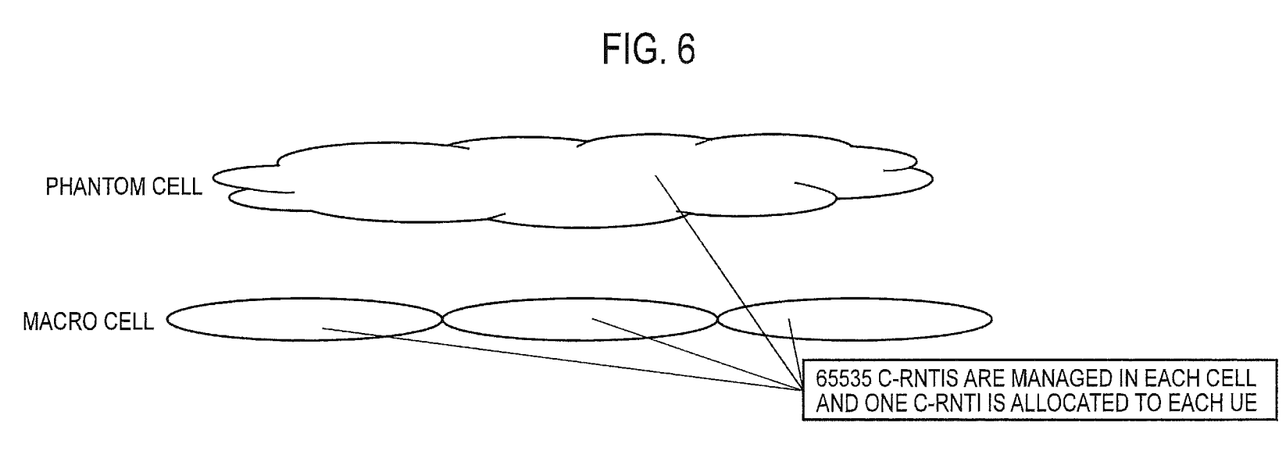
FIG. 6 is a diagram for illustrating the conventional technology.

However, as illustrated in FIG. 6, 65535 C-RNTIs are managed in each cell (a macro cell and a phantom cell), and one C-RNTI has to be allocated to each mobile station UE.

Here, when the coverage area of the phantom cell becomes wider, the number of mobile stations UE performing communications in the phantom cell increases. Accordingly, envisaged is a problem of causing a case in which the phantom cell may run out of C-RNTIs allocatable to the mobile stations UE.

Figure 7:
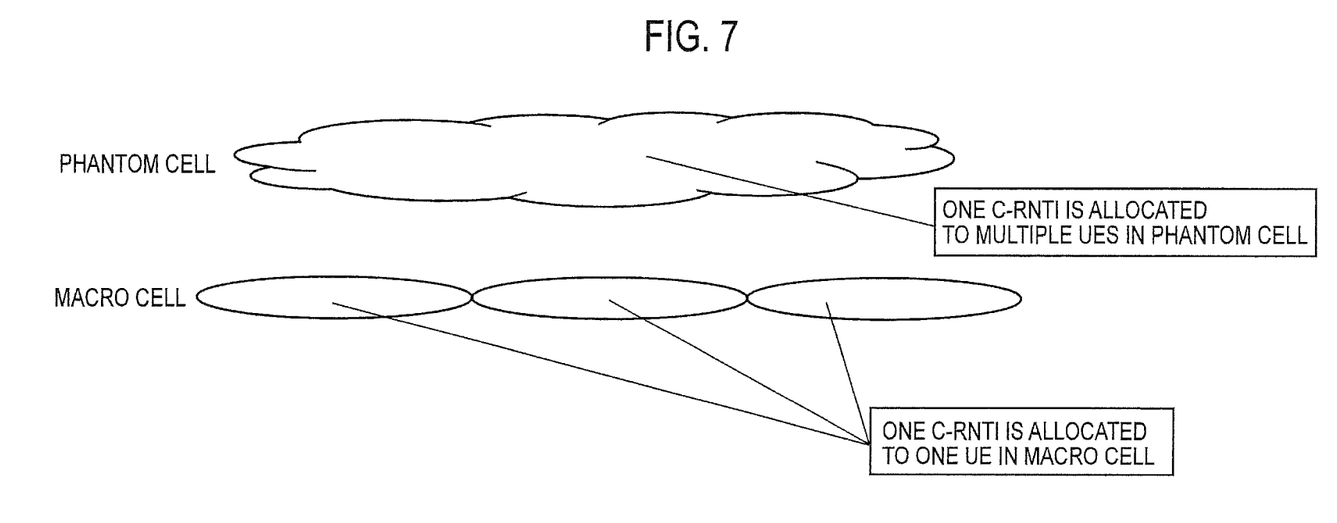
FIG. 7 is a diagram for illustrating the conventional technology.

In a conceivable operation for solving the above-described problem, as illustrated in FIG. 7, one $C\text{-}RNTI_{macro}$ is allocated to each mobile station UE in a macro cell, while one $C\text{-}RNTI_{ph}$ is allocated to multiple (a plurality of) mobile stations UE in a phantom cell (in other words, one $C\text{-}RNTI_{ph}$ is shared between the multiple mobile stations UE).

Meanwhile, according to the specifications of LTE, when a RA procedure is activated under the condition that a connection is already established between a mobile station UE and a radio base station eNB, a notification of a C-RNTI allocated to the mobile station UE with a "UL grant" designated by a "RA response" is sent in "C-RNTI MAC CE" to the radio base station eNB.

Figure 8:
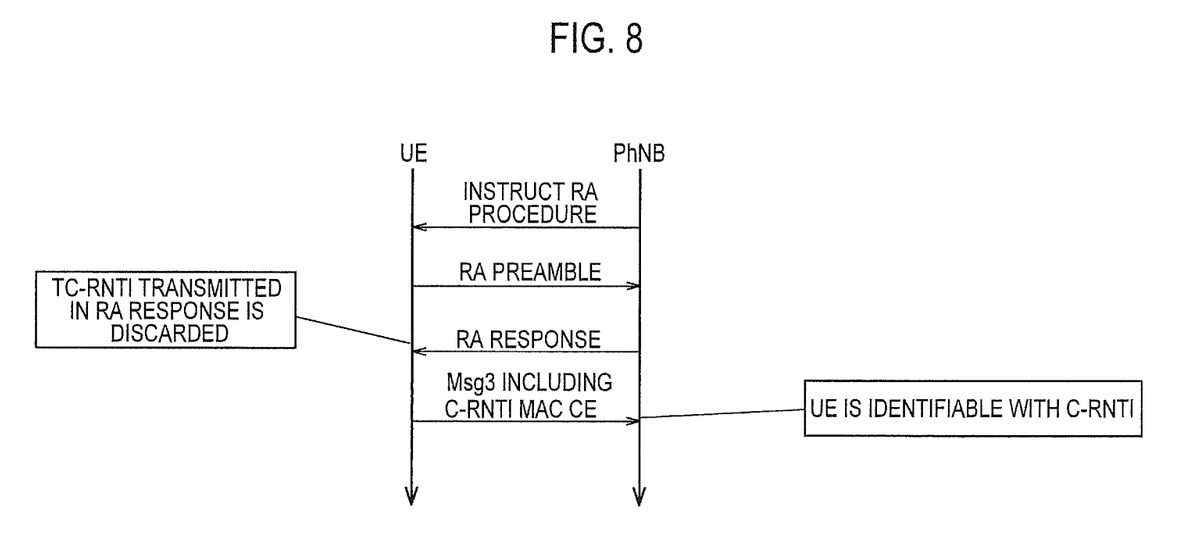
FIG. 8 is a diagram for illustrating the conventional technology.

In such a case, the following problem occurs. Specifically, in a "Non-contention based RA procedure" or a "Contention based RA procedure," even if the mobile station UE performing communications in a phantom cell notifies the radio base station PhNB managing the phantom cell of the $C\text{-}RNTI_{ph}$ allocated in the phantom cell through the "C-RNTI MAC (Media Access Control) CE (Control Element)" as illustrated in FIG. 8, the radio base station PhNB cannot uniquely identify the mobile station UE.

For this reason, the present invention is made with view to the above-described problem, and has an objective to provide a mobile communication method and a mobile station, which enable a radio base station PhNB managing the phantom cell to uniquely identify a mobile station UE performing communications in a phantom cell.

A first feature of the present invention is summarized as a mobile communication method, including: starting, by a radio base station, a random access procedure with a mobile station being in communication in a cell under control of the radio base station; and notifying, by the mobile station, in the random access procedure, the radio base station of a cell identifier which is allocated in a cell other than the cell.

A second feature of the present invention is summarized as a mobile communication method, including: starting, by a radio base station, a random access procedure with a mobile station being in communication in a cell under control of the radio base station; and notifying, by the mobile station, in the random access procedure, the radio base station of a cell identifier which is allocated in a cell designated by the radio base station other than the cell.

A third feature of the present invention is summarized as a mobile station, including: a transmission unit configured to notify a radio base station of a cell identifier in a random access procedure if the random access procedure is started with the radio base station during communication in a cell under control of the radio base station, the cell identifier being an identifier allocated in a cell other than the cell.

A fourth feature of the present invention is summarized as a mobile station, including: a transmission unit configured to notify a radio base station of a cell identifier in a random access procedure if the random access procedure is started with the radio base station during communication in a cell under control of the radio base station, the cell identifier being an identifier allocated in a cell designated by the radio base station other than the cell.

DETAILED DESCRIPTION (Mobile Communication System According to the First Embodiment of the Present Invention)

Figure 1:
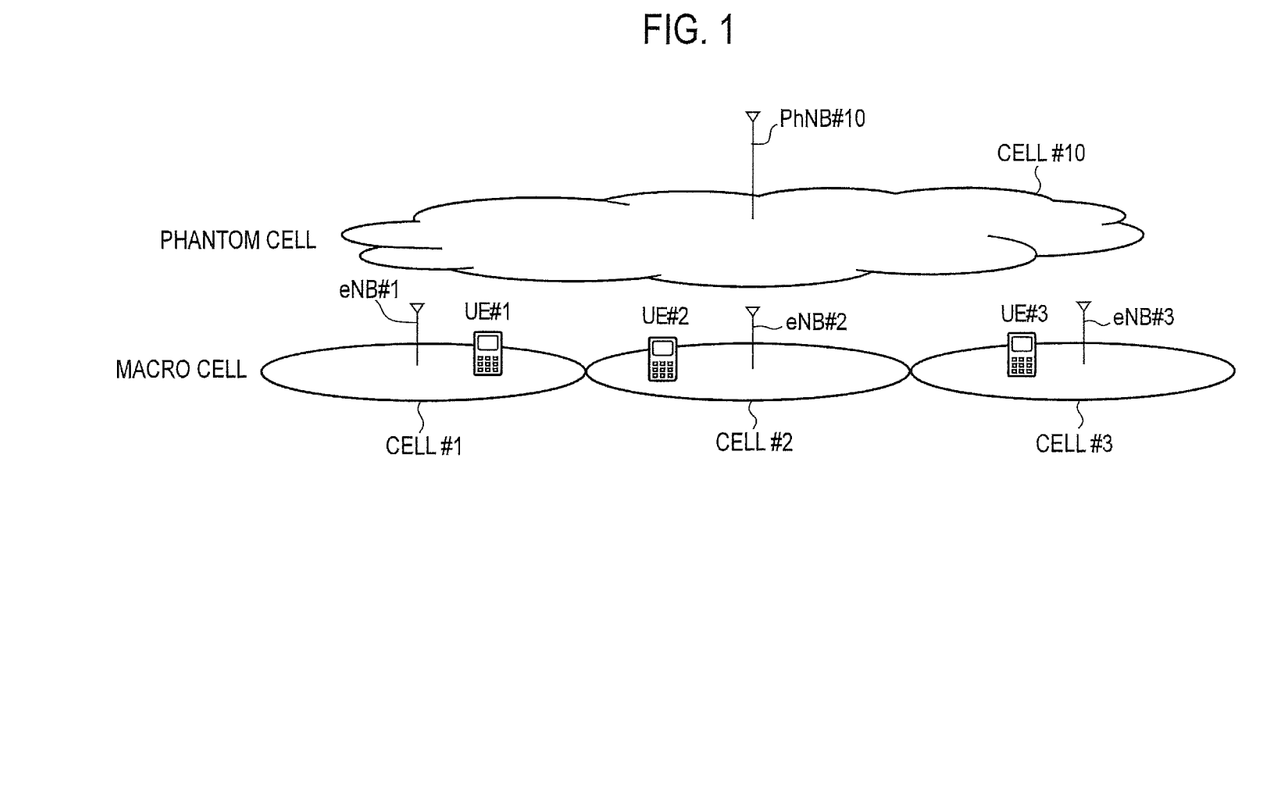
FIG. 1 is an entire configuration diagram of a mobile communication system according to a first embodiment of the present invention.
Figure 2:
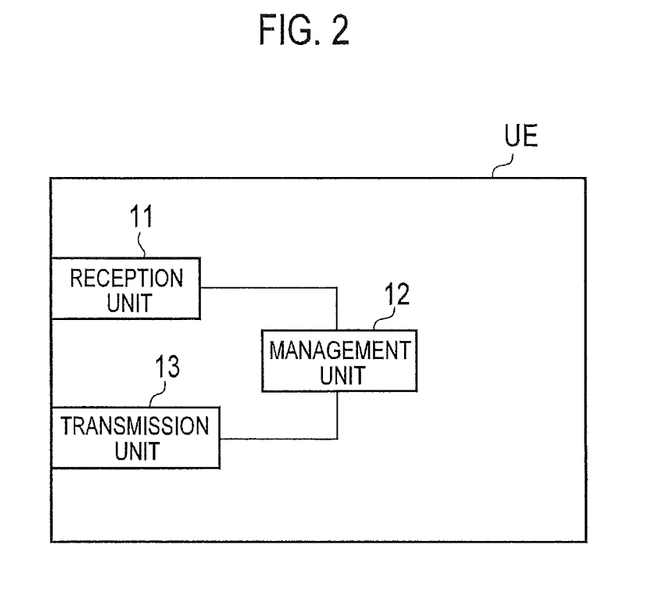
FIG. 2 is a functional block diagram of a mobile station according to the first embodiment of the invention.
Figure 3:
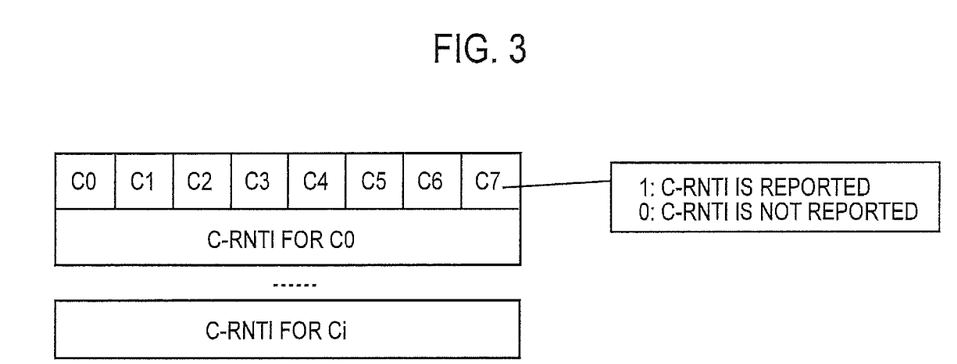
FIG. 3 is a diagram illustrating an example of a "C-RNTI MAC CE" which is transmitted by the mobile station according to the first embodiment of the invention.

Described by referring to FIGS. 1 to 3 is a mobile communication system according to a first embodiment of the present invention.

As illustrated in FIG. 1, a mobile communication system according to the present embodiment is an LTE mobile communication system, which includes a radio base station PhNB#10 configured to manage a cell #10, a radio base station eNB#1 configured to manage a cell #1, a radio base station eNB#2 configured to manage a cell #2, and a radio base station eNB#3 configured to manage a cell #3.

Here, the cell #10 is a phantom cell formed by linking multiple small cells and the cells #1 to #3 are macro cells.

As illustrated in FIG. 1, a coverage area of the cell #10 and coverage areas of the cells #1 to #3 are deployed to at least partially overlap each other.

Note that, it is configured in the mobile communication system according to the present embodiment that a same $C\text{-}RNTI_{ph}$ can be allocated to multiple mobile stations UE in the cell #10.

On the other hand, the mobile communication system according to the present embodiment is configured such that a same $C\text{-}RNTI_{macro}$ cannot be allocated to multiple mobile stations UE in the cells #1 to #3.

It is configured in the mobile communication system according to the present embodiment that multiple C-RNTIs (in other words, $C\text{-}RNTI_{macro}$ and $C\text{-}RNTI_{ph}$) can be allocated to one mobile station UE.

The configurations of the mobile stations UE#1 to UE#3 are basically same with one another, and the description is mainly given below as the configuration of a mobile station UE.

As illustrated in FIG. 2, the mobile station UE according to the present embodiment includes a reception unit 11, a management unit 12, and a transmission unit 13.

The reception unit 11 is configured to receive various kinds of signals from the radio base stations PhNB#10/eNB#1/eNB#2/eNB#3. The transmission unit 13 is configured to transmit various kinds of signals to the radio base stations PhNB#10/eNB#1/eNB#2/eNB#3.

For example, the reception unit 11 is configured to receive a $C\text{-}RNTI_{macro}$ allocated to the mobile station UE from the radio base stations eNB#1 to eNB#3.

Also, the reception unit 11 is configured to receive a $C\text{-}RNTI_{ph}$ allocated to the mobile station UE from the radio base station PhNB#10.

The management unit 12 is configured to manage $C\text{-}RNTI_{macro}$ and/or $C\text{-}RNTI_{ph}$ which is allocated to the mobile station UE in each of the cells #1 to #3/#10.

Here, the transmission unit 13 notifies the radio base station PhNB#10 of a $C\text{-}RNTI_{macro}$ or the like which is allocated in a cell other than the cell #10 (for example, the cell #1) in the "RA procedure" when the "Non-contention based RA procedure" or "Contention based RA procedure" is started with the radio base station PhNB#10.

For example, the transmission unit 13 notifies the radio base station PhNB#10 of a $C\text{-}RNTI_{macro}$ or the like which is allocated in a cell other than the cell #10 by using a format of the "C-RNTI MAC CE" illustrated in FIG. 3.

In such a case, the transmission unit 13 may also notify the radio base station PhNB#10 of the $C\text{-}RNTI_{ph}$ allocated in the cell #10.

In the format of "C-RNTI MAC CE" illustrated in FIG. 3, whether or not C-RNTIs are allocated in the cells C0 to C7 can be set in "C0" to "C7" and the C-RNTI allocated in a cell Ci (C0 to C7) can be set in "C-RNTI for Ci (C0 to C7)."

Alternately, whether or not the C-RNTIs allocated in the cells C0 to C7 are reported can be set in "C0" to "C7."

In addition, the radio base station eNB notifies which of indexes "C0" to "C7" is associated with the cell set for the mobile station UE.

Such notification may be sent in any layer such as RRC layer, PDCP layer, RLC layer, MAC layer, and physical layer.

As illustrated in FIG. 8, in "Non-contention based RA procedure" or "Contention based RA procedure" with the radio base station PhNB#10, the transmission unit 13 notifies the radio base station PhNB#10 of the "C-RNTI MAC CE" on MSG3 (PUSCH corresponding to the "UL grant" designated by the "RA response").

Here, the "Non-contention based RA procedure" or "Contention based RA procedure" is performed when an uplink synchronization loss occurs or in the handover processing, in other words, when the mobile UE is in the RRC Connected state.

The mobile communication system according to the present embodiment can acquire the C-RNTI allocated to the mobile station UE in other cell in addition to the $C\text{-}RNTI_{ph}$ allocated to the mobile station UE in the cell #10 based on the "C-RNTI MAC CE" received from the mobile station UE. Thus, even when the same $C\text{-}RNTI_{ph}$ is allocated to the multiple mobile stations UE in the cell #10, the mobile station UE performing communications in the cell #10 can be uniquely identified.

Also, in a case where the multiple C-RNTIs are allocated to the mobile station UE, when C-RNTIs equal to or more than the C-RNTIs which are needed to identify the mobile station UE by the radio base station eNB, are reported, an overhead becomes large. Thus, it is not desirable in terms of an efficiency of radio resource utilization.

Accordingly, the number of the C-RNTIs to be reported by the mobile station UE may be designated from the radio base station eNB.

The number of the C-RNTIs or for which cell the C-RNTI is to be reported may be notified in any layer such as RRC or PDCP layer, RLC layer, MAC layer, or Physical layer.

Also, the cell to be reported may be designated by an identifier of the cell (PCI: Physical Cell Identifier) or may be designated by Index of cell (for example, Scell Index) which is associated with the PCI.

The features of the present embodiment may also be expressed as follows.

A first feature of the present embodiment is summarized as a mobile communication method, including: starting, by a radio base station PhNB#10, a "Non-contention based RA procedure (non-contention based random access procedure)" or a "Contention based RA procedure (contention based random access procedure)," with a mobile station UE#1 being in communication in a cell #10 under control of the radio base station PhNB#10; and notifying, by the mobile station UE#1, in the "Non-contention based RA procedure" or the "Contention based RA procedure," the radio base station PhNB#10 of a $C\text{-}RNTI_{macro}$ (cell identifier) which is allocated in a cell #1 other than the cell #10.

A second feature of the present embodiment is summarized as a mobile communication method, including: starting, by a radio base station PhNB#10, a RA procedure (random access procedure) with a mobile station UE#1 being in communication in a cell #10 under control of the radio base station PhNB#10; and notifying, by the mobile station UE, in the RA procedure, the radio base station PhNB#10 of a C-RNTI which is allocated in a cell designated by the radio base station PhNB#10 other than the cell #10.

A third feature of the present embodiment is summarized as a mobile station UE, including: a transmission unit 13 configured to notify a radio base station PhNB#10 of a C-RNTI$_{macro}$ in a "Non-contention based RA procedure" or a "Contention based RA procedure" if the "Non-contention based RA procedure" or the "Contention based RA procedure" is started with the radio base station PhNB#10 during communication in a cell #10 under control of the radio base station PhNB#10, the C-RNTI$_{macro}$ being an identifier allocated in a cell #1 other than the cell #10.

In the above-described example, the C-RNTI$_{macro}$ is described as the C-RNTI allocated in the cell #1 other than the cell #10. However, it is not limited to the C-RNTI$_{macro}$ but may be a C-RNTI which is allocated to the mobile station UE in a cell other than the cell #10.

A fourth feature of the present embodiment is summarized as a mobile station UE, including: a transmission unit 13 configured to notify a radio base station PhNB#10 of a C-RNTI in a RA procedure if the RA procedure is started with the radio base station PhNB#10 during communication in a cell #10 under control of the radio base station PhNB#10, the C-RNTI being an identifier allocated in a cell designated by the radio base station PhNB#10 other than the cell #10.

It should be noted that the foregoing operations of the mobile stations UE#1 to UE#3 and the radio base stations eNB#1/eNB#2/eNB#3/PhNB#10 may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile stations UE#1 to UE#3 and the radio base stations eNB#1/eNB#2/eNB#3/PhNB#10. Otherwise, the storage medium and the processor may be provided as discrete components inside the mobile stations UE#1 to UE#3 and the radio base stations eNB#1/eNB#2/eNB#3/PhNB#10.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2012-188692 (filed on Aug. 29, 2012) is incorporated by reference in the present specification.

INDUSTRIAL APPLICABILITY

As described above, the present invention can provide a mobile communication method and a mobile station which enable radio base station PhNB managing a phantom cell to uniquely identify a mobile station performing communications in the phantom cell.

EXPLANATION OF REFERENCE NUMERALS eNB#1, eNB#2, eNB#3, PhNB#10 radio base station
UE mobile station
11 reception unit
12 management unit
13 transmission unit

The invention claimed is:
1. A mobile communication method, comprising:
starting, by a radio base station, a random access procedure with a mobile station being in communication in a cell formed by linking several small cells under control of the radio base station; and
notifying, by the mobile station, in the random access procedure, the radio base station of a cell radio network temporary identifier (C-RNTI) which is allocated in a macro cell other than the cell,
wherein a coverage area of the cell partially overlaps a coverage area of the macro cell.
2. A mobile communication method, comprising:
starting, by a radio base station, a random access procedure with a mobile station being in communication in a cell formed by linking several small cells under control of the radio base station; and
notifying, by the mobile station, in the random access procedure, the radio base station of a cell radio network temporary identifier (C-RNTI) which is allocated in a macro cell designated by the radio base station other than the cell,
wherein a coverage area of the cell partially overlaps a coverage area of the macro cell.
3. A mobile station, comprising:
a processor and memory; and
a transmitter that notifies a radio base station of a cell radio network temporary identifier (C-RNTI) stored in the memory in a random access procedure if the random access procedure is started with the radio base station during communication in a cell formed by linking several small cells under control of the radio base station, the C-RNTI being an identifier allocated in a macro cell other than the cell,
wherein a coverage area of the cell partially overlaps a coverage area of the macro cell.
4. A mobile station, comprising:
a processor and memory; and
a transmitter that notifies a radio base station of a cell radio network temporary identifier (C-RNTI) stored in the memory in a random access procedure if the random access procedure is started with the radio base station during communication in a cell formed by linking several small cells under control of the radio base station, the C-RNTI being an identifier allocated in a macro cell designated by the radio base station other than the cell, wherein a coverage area of the cell partially overlaps a coverage area of the macro cell.

* * * * *